(12) United States Patent
Agarwal et al.

(10) Patent No.: US 8,925,443 B2
(45) Date of Patent: Jan. 6, 2015

(54) VARIABLY THROTTLED BEVERAGE AERATOR

(75) Inventors: Dhruv Agarwal, Seattle, WA (US); Erin Malaspino, Seattle, WA (US); Amy Lin, Lacey, WA (US)

(73) Assignee: True Fabrications, Inc., Seattle, WA (US)

( * ) Notice: Subject to any disclaimer, the term of this patent is extended or adjusted under 35 U.S.C. 154(b) by 110 days.

(21) Appl. No.: 13/332,037

(22) Filed: Dec. 20, 2011

(65) Prior Publication Data

US 2012/0156338 A1 Jun. 21, 2012

Related U.S. Application Data

(60) Provisional application No. 61/425,183, filed on Dec. 20, 2010.

(51) Int. Cl.
| | |
|---|---|
| *C12G 3/06* | (2006.01) |
| *C12H 1/22* | (2006.01) |
| *A23F 3/00* | (2006.01) |
| *A23L 2/54* | (2006.01) |
| *B01F 3/04* | (2006.01) |
| *C12H 1/14* | (2006.01) |
| *C12G 3/07* | (2006.01) |
| *A47J 31/44* | (2006.01) |
| *B01F 5/04* | (2006.01) |
| *B01F 13/00* | (2006.01) |

(52) U.S. Cl.
CPC *C12H 1/14* (2013.01); *C12G 3/065* (2013.01); *A47J 31/4485* (2013.01); *B01F 5/0426* (2013.01); *B01F 5/0428* (2013.01); *B01F 13/002* (2013.01); *B01F 2005/0435* (2013.01); *B01F 2215/0072* (2013.01)
USPC ............................. 99/323.1; 99/277.1

(58) Field of Classification Search
CPC ...... A47J 31/4485; A47J 31/14; C12G 3/065; C12C 7/17; B05B 7/0037; B05C 17/00546; F24F 6/12; F24F 6/18; A01K 63/042; B01F 3/04099
USPC ............... 99/323.1, 277.1, 277.2; 222/190, 222/189.07, 113; 261/116, 6, DIG. 75, 261/DIG. 76
See application file for complete search history.

(56) References Cited

U.S. PATENT DOCUMENTS

| | | | | |
|---|---|---|---|---|
| 3,727,640 | A * | 4/1973 | Sargeant | 137/889 |
| 5,509,349 | A * | 4/1996 | Anderson et al. | 99/323.1 |
| 5,645,223 | A * | 7/1997 | Hull et al. | 239/428.5 |

(Continued)

*Primary Examiner* — Dana Ross
*Assistant Examiner* — Hemant Mathew
(74) *Attorney, Agent, or Firm* — Lowe Graham Jones PLLC

(57) ABSTRACT

A method and apparati for regulating introduction of ambient air begins with initiating a liquid flow through a venturi to induce a localized drop in pressure at a bowl situated at a venturi throat. Airflow is admitted at a barrel inlet, through a first barrel lumen segment to a first half-moon port at a throttle first side. The airflow is selectively obstructed by a second half-moon port whose rotational position relative to the first half-moon port defines a variable aperture. The airflow is conducted from the second half-moon port through a second barrel lumen segment to the barrel outlet and mixing with the liquid to produce an aerated liquid.

13 Claims, 11 Drawing Sheets

(56) References Cited

U.S. PATENT DOCUMENTS

| | | | |
|---|---|---|---|
| 6,568,660 B1 * | 5/2003 | Flanbaum | 261/76 |
| 7,614,614 B2 * | 11/2009 | Sabadicci et al. | 261/76 |
| 7,841,584 B2 * | 11/2010 | Sabadicci et al. | 261/76 |
| 7,992,844 B2 * | 8/2011 | Chiorazzi | 261/76 |
| 8,011,540 B1 * | 9/2011 | Peckels | 222/479 |
| 8,430,023 B2 * | 4/2013 | Hynes | 99/323.1 |
| 2007/0256568 A1 * | 11/2007 | Nudi et al. | 99/275 |
| 2010/0031921 A1 * | 2/2010 | Rarick | 123/337 |

* cited by examiner

VARIABLY THROTTLED BEVERAGE AERATOR

PRIORITY CLAIM

The Applicant claims priority to U.S. Provisional Patent Application 61/425,183 entitled "Adjustable Aeration Devices" and filed on Dec. 20, 2010; the provisional application is incorporated herein fully by this reference.

FIELD OF THE INVENTION

The field of invention comprises aeration of beverages containing tannin, more specifically the variable aeration of such beverages.

BACKGROUND OF THE INVENTION

In the Dec. 10, 1984 issue of the New York magazine, noted wine writer, Alexis Bespaloff ruminated on the practice of allowing wines to breathe with the statement, "the fine red wines served at this time of year need a little extra attention to bring out all their special qualities." He went on to describe an experimental tasting he arranged to test the effects of decanting an aerating on certain wines, especially older reds, might do more to destroy than to enhance the delicate bouquet, fruit, and flavor of certain fine reds. Spurred by Bespaloff, oenologists worldwide, but especially in California and in Italy and Australia, have studied the effects of aeration on reds and have found that not all wines benefit from maximum aeration. Interestingly enough, in a market where growing conditions on the sunny side of a slope might cause a discernable difference between the wines of one estate over those of another, consumers have been willing to accept a "one-size-fits-all" approach to the proper aeration of wines.

One such example of the "one-size-fits-all" approach has been the Vinturi™. Described in U.S. Pat. No. 7,614,614 to Sabadicci, et al (Nov. 10, 2009), the aerator has "two diametrically opposed sidearm passageways fluidly connected to the intermediate passageway to thus enable a second fluid to be drawn into and introduced with the first fluid." Any effect of aeration observable in use of the Vinturi™ occurs only at a fixed oxygenation ratio; the ratio itself dependent upon the fluid dynamics within a chamber where the "first fluid experiences a slight reduction in pressure" used to entrain oxygen. With no means of varying entrained oxygen within the Vinturi™, Chablis and Bordeaux are oxygenated in the exact same ratio. Given the fixed ratio, there is no assurance of an optimal oxygenation of the wine after passage through the Vinturi™.

In every assertion that "breathing" enhances a wine, the expected results are varied based upon such factors as the type of wine, its age, tannin content, and the use of oaken barrels in its aging. The Oxford English Dictionary says that scientific method is: "a method of procedure that has characterized natural science since the 17th century, consisting in systematic observation, measurement, and experiment, and the formulation, testing, and modification of hypotheses." To assume that the aesthetic results of oxygenation of wine or, indeed, other beverages such as brewed tea, is a smooth function of the oxygen entrained in the beverage, the need for an iterative regimen of aeration and tasting asserts itself. Repeated aeration and taste testing are necessary to discern the optimal amount of entrained oxygen.

"De gustibus non est disputandum", i.e. in matters of taste, there can be no argument. Nowhere is this truer than in the purely subjective world of wine. Even where an optimal aeration is proposed, there ought to exist the ability to experiment on one's own. "The discovery of a wine is of greater moment than the discovery of a constellation. The universe is too full of stars."—Benjamin Franklin.

Even without knowing specific ratios based upon the recited factors in wine, if one accepts the utility of introducing ambient air into contact with wine, the ability to vary the entrained oxygen an aerator introduces becomes a necessity. To exploit such a regimen requires a variable means of wine aeration. The current art lacks a convenient variable aerator for enhancement of wine.

SUMMARY OF THE INVENTION

A method and apparati for regulating introduction of ambient air begins with initiating a liquid flow through a venturi to induce a localized drop in pressure at a bowl situated at a venturi throat. Airflow is admitted at a barrel inlet, through a first barrel lumen segment to a first half-moon port at a throttle first side. The airflow is selectively obstructed by a second half-moon port whose rotational position relative to the first half-moon port defines a variable aperture. The airflow is conducted from the second half-moon port through a second barrel lumen segment to the barrel outlet and mixing with the liquid to produce an aerated liquid.

BRIEF DESCRIPTION OF THE DRAWINGS

Preferred and alternative examples of the present invention are described in detail below with reference to the following drawings.

DETAILED DESCRIPTION OF THE PREFERRED EMBODIMENT

Figure 1:
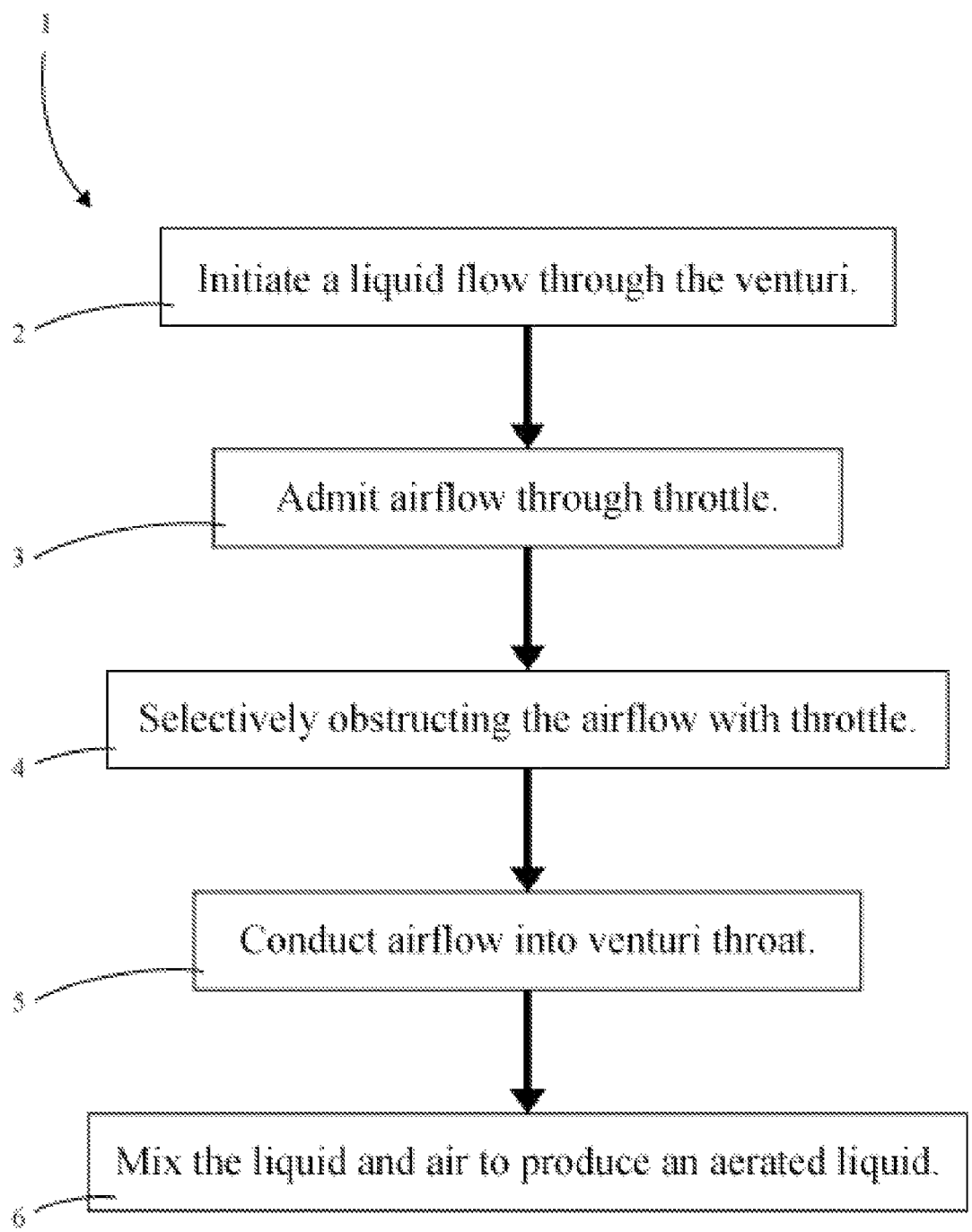
FIG. 1 sets forth a flow chart of the inventive method for variable aeration of beverages.
Figure 2:
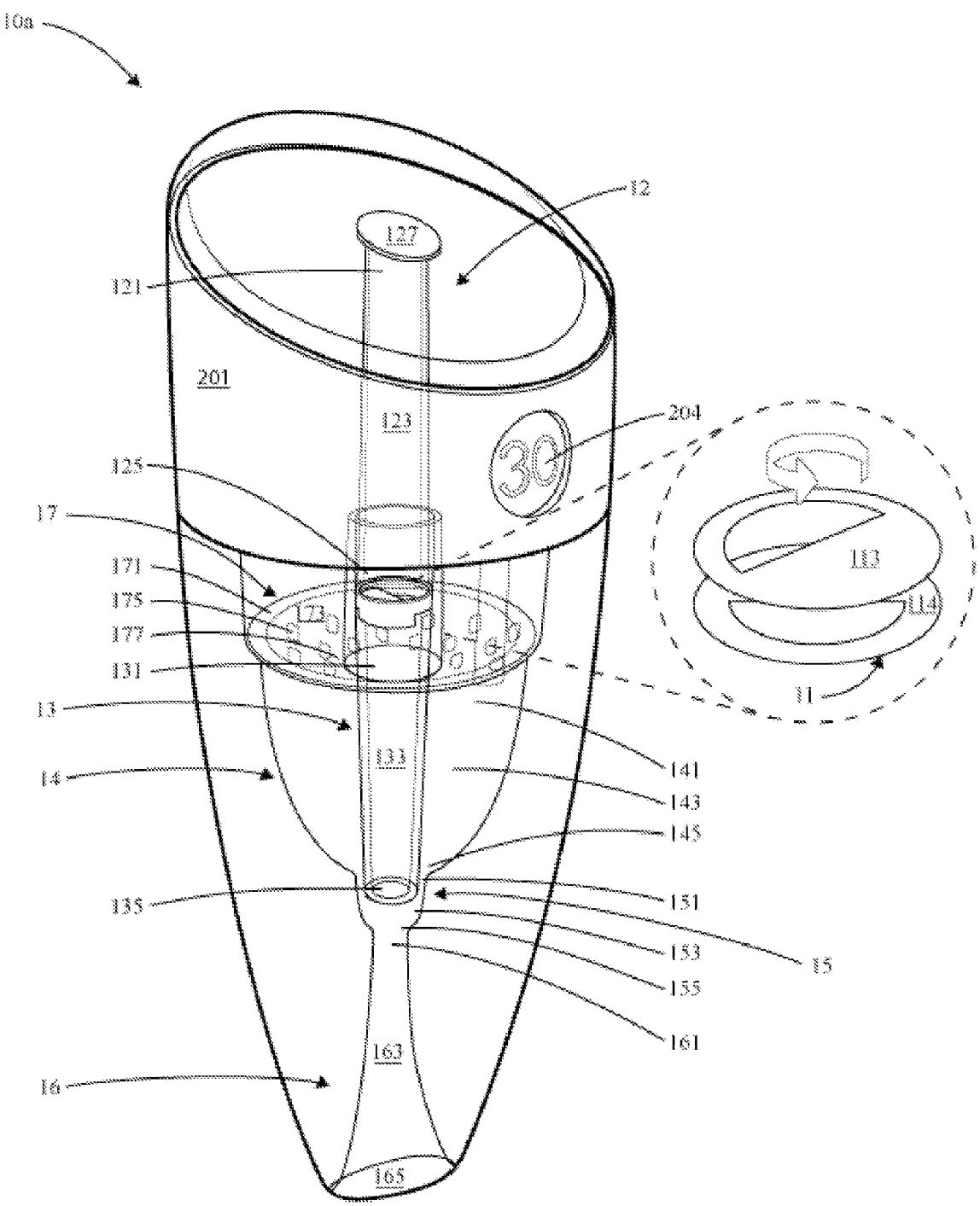
FIG. 2 depicts an assembled beverage aerator with an inset showing a throttle.
Figure 3:
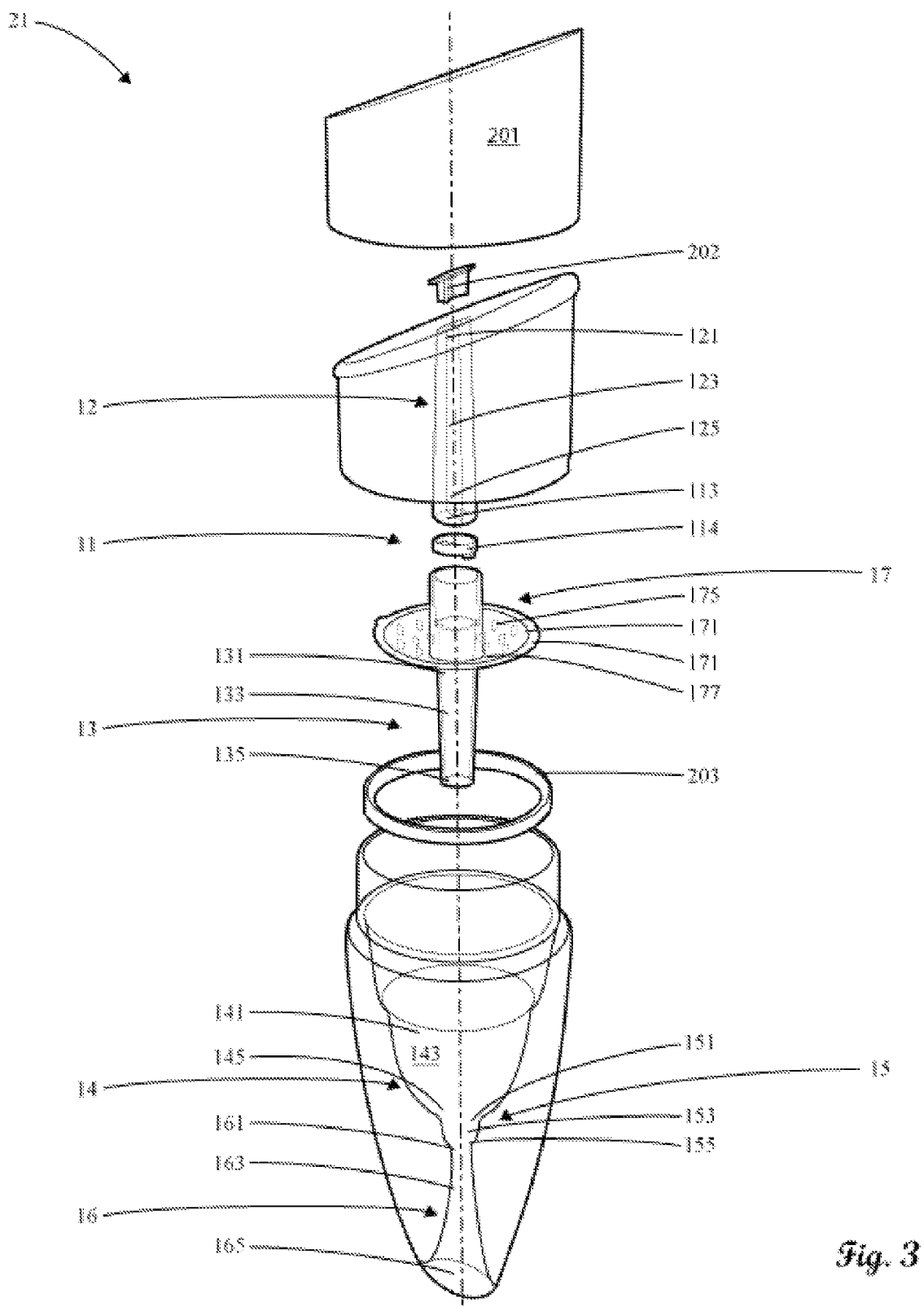
FIG. 3 depicts the assembled beverage aerator in exploded view.
Figure 4:
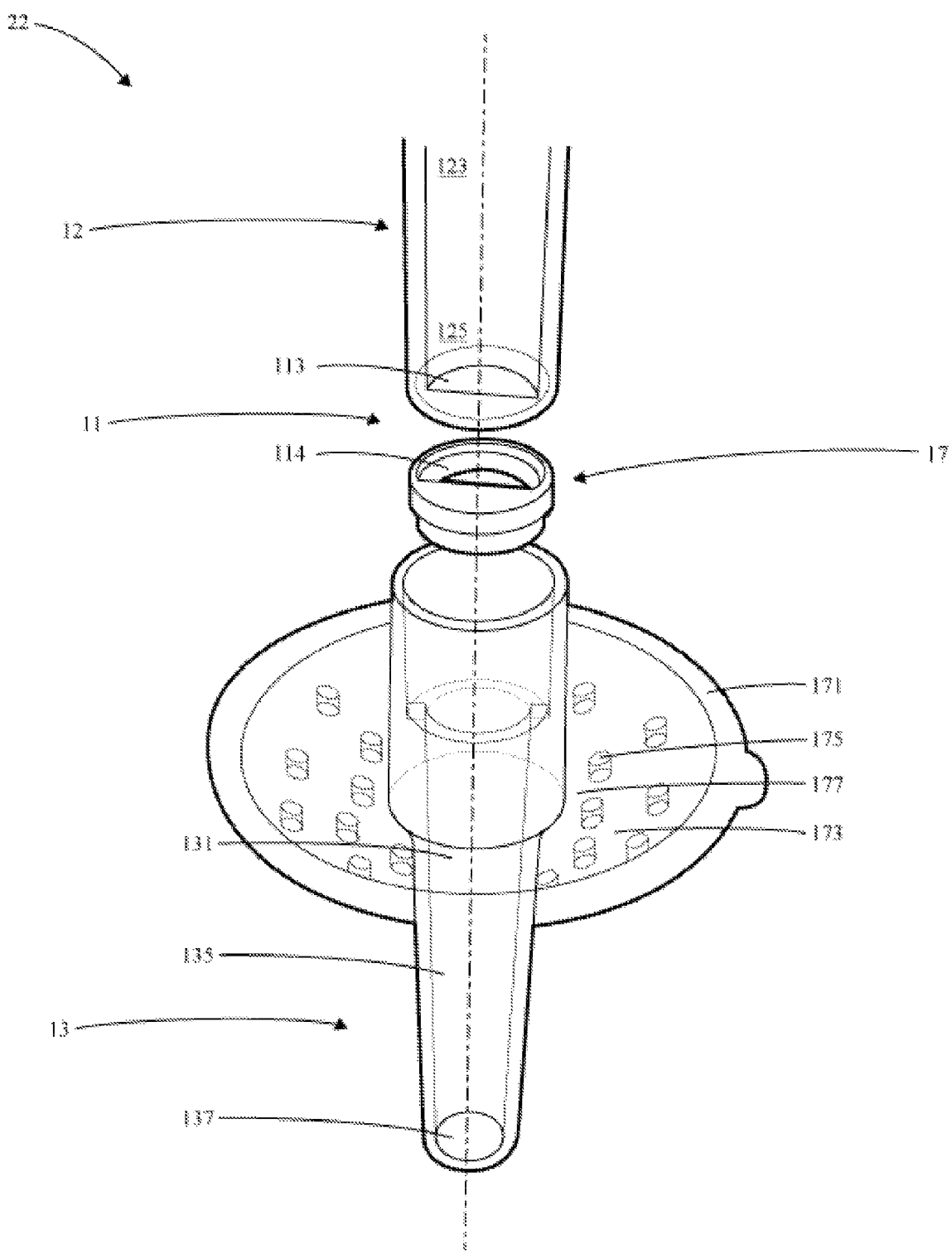
FIG. 4 depicts, in detail, the throttle assembly in exploded view.
Figure 5:
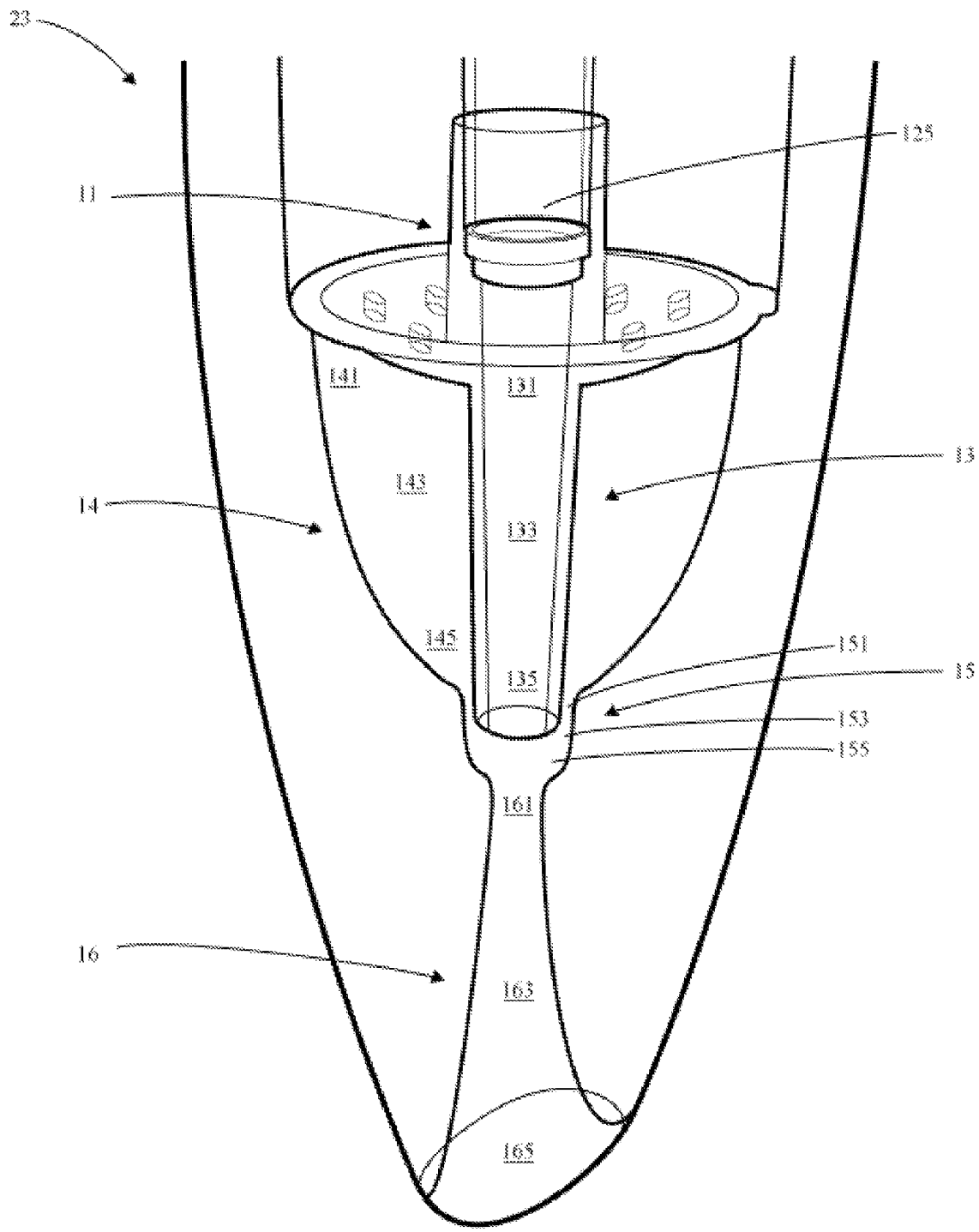
FIG. 5 depicts, in detail, the venturi including the funnel, mixing bowl, and horn.

A method 1 for regulating introduction of ambient air through a beverage aerator having a venturi begins by initiating, at a block 2, a liquid flow through the venturi to induce a localized drop in pressure at a bowl situated at a venturi throat within the venturi. The Venturi effect is a jet effect; as with a funnel the velocity of the fluid increases as the cross sectional area decreases, with the static pressure correspondingly decreasing. According to the laws governing fluid dynamics, a fluid's velocity must increase as it passes through a constriction to satisfy the principle of continuity, while its pressure must decrease to satisfy the principle of conservation of mechanical energy. Thus any gain in kinetic energy a fluid may accrue due to its increased velocity through a constriction is negated by a drop in pressure. In the instant invention, the beverage to aerated passes through the venturi to provide the drop in pressure the Venturi effect dictates.

At a block 3, the pressure differential is exploited to motivate an airflow admitted at a barrel inlet, through a first barrel lumen segment to a throttle first side. A throttle is the mechanism by which the flow of a fluid is managed by constriction or obstruction. In the several embodiments of the invention, throttling occurs by movement of a surface defining a first port along a second surface defining a second port. By varying the position of the first surface relative to the second, an opening having a selected area is defined by the cooperation of the surfaces. By selectively forming the opening according to form an aperture of desired area, airflow through the first barrel lumen is regulated.

Thus, by this act of selectively obstructing the airflow at a block 4, by manipulating the second surface relative to the first, an amount of air in an airflow presents itself at the second side fo the throttle for use in aeration of the beverage flowing through the venturi.

At a block 5, the air flow is conducted from the second side of the throttle through a second barrel lumen segment to the barrel outlet for mixing the liquid and airflows immediate to the venturi throat to produce an aerated liquid at a block 6.

Referring to each of FIGS. 2 through 5, a first embodiment of a variably throttled beverage aerator 10a is depicted. A liquid path though a venturi throat 15 includes a funnel 14, the bowl 15 and a horn 16. An airflow path into the bowl 15, includes a first barrel segment 12 and a second barrel segment 13 interrupted by a throttle 11.

In describing the aerator in all of the embodiments, the terms beverage, liquid and wine will be used interchangeably. While wine is the most common beverage to be aerated, it is not the only such liquid, as, for example, brewed tea is also often aerated to smooth the perceived taste of the tannins present therein. Thus, in every instance, the use of the terms are not limited to wine but are to be read to include any beverage containing tannin.

Following a flow of liquid through the venturi bowl 15 is illustrative of the more conventional aspects of the inventive aerator 10a, 21 (exploded first embodiment), 22 (exploded barrel assembly), and 23 (exploded venturi assembly). Wine enters the aerator 10a to pass through a strainer 17 having regulating holes 175 a bowled surface 173 defines. A rim 171 circumferentially borders the bowled surface 173. The strainer 17 is fixed to a lower barrel segment 13 at a barrel attachment flange 177. Because the aerator 10a supplants the physical step of decanting wine, the strainer 17 is present to remove such particulate that may be entrained in the liquid flow from a bottle. While still present, the use of the strainer 17 to remove particulate is rarely necessary, especially with more modern wines; the nature of the fermenting and bottling process has operated to largely exclude particulate from wines and, thus, such particulate as might exist will have minimal volume.

A far more important function of the strainer 17 is to meter the flow of wine through the regulating holes 175 just as the throat of an hourglass regulates the flow of sand. As such, a roughly constant volume of wine flows through the aerator 10a during each discrete period of operation. With a relatively constant liquid flow, variable aeration becomes a function of a selectively variable supply of air entrained in the liquid flow. Providing a selected greater volume of air flow causes a predictably reproducible and greater level of aeration. Providing a selected lesser volume of air flow allows a predictably reproducible and lower level of aeration.

In the instant aerator, the constricted section of the passage to produce the Venturi Effect occurs at a venturi bowl 15, where a funnel outlet 145 and a bowl inlet 151 meet. Airflow is there introduced through the second barrel segment 13 having a second barrel intake 131 and a second barrel lumen 133 that discharges the airflow at its second barrel outlet 135.

In an embodiment of the aerator, the bowl body 153 is shaped to take further advantage of the kinetic energy of the liquid flow. Curvature of a wall of the bowl body 153 causes the regulated flow of the liquid to, in part, climb the wall of the bowl body 153 folding in air introduced at the second barrel outlet 135 for a more thorough aeration of the liquid flow as it is discharged through the horn 16.

As indicated above, aeration of the liquid is a function of a throttled flow of air into the bowl 15 at the second barrel outlet 135. An airflow is conducted into the bowl 15 from the ambient by a first barrel segment 12 at a first barrel inlet 121, which, in a preferred embodiment rests beneath a barrel inlet cap 127 to protect the first barrel inlet 121 from the incursion of liquid. The first barrel segment 12 comprises a first barrel lumen 123 having a first barrel inlet 121 and a first barrel outlet 125 and the second barrel segment 13.

Continuity of the barrel segments 12, 13 is interrupted by the throttle 11. The throttle 11, in turn, comprises two cooperating ports: a first half-moon port 113 forms an end of the first barrel lumen segment 12 at a first throttle side located at the first barrel outlet 125. A second half-moon port 114 at the second barrel intake 131 into the second barrel lumen 133 defining a second throttle side. The first half-moon port 113 rotates with the first barrel segment 12 and cooperates with the second half-moon port 114 which is mechanically connected to the second barrel segment 13 and remains stationary relative to the bowl 15. Together, the rotatable first half-moon port 113 and the stationary second half-moon port 114 cooperate to form a variable throttle 11. With the barrel segments 12, 13, the half-moon ports 113, 114 form a throttle assembly.

As the airflow is regulated at the throttle 11 it arrives at the bowl 15 passing through the second barrel outlet 135 for entrainment in the liquid flow. The liquid pressure increases to approach ambient pressure as the liquid passes through the horn 16 driving the entrained air into further and more intimate contact with the liquid flow. Aeration is more thorough and uniform as the aerated liquid flow emerges from the horn outlet 165.

A collar 204 is configured to allow a user to reproducibly regulate aeration. Affixed to the first barrel segment 12, the collar 204 allows easy tool-less rotation of the first barrel segment 12 and correspondingly the first half-moon port 113 in the throttle 11. As a result aeration is varied as the collar 204 is rotated. To aid in reproducing aeration levels, indicia 201 (in this nonlimiting embodiment, numbers suggestive of aeration efficiency) appear in position relative to a stationary index (in this nonlimiting embodiment a sleeve surrounding the collar 204 having a window to display the indicia, numbers in the window).

To study and experiment with effects of aeration levels on taste relative to wines of a given age, type, or tannin content, an oenophile need only rotate the collar 204 and observe the numbers appearing in a window in the index 201 and record impressions of taste. Once an optimal aeration level is noted and recorded, the oenophile can, at a later date, rotate the collar such that the relation between the index 201 and indicia is reproduced and the wine is, again, optimally aerated.

Figure 6:
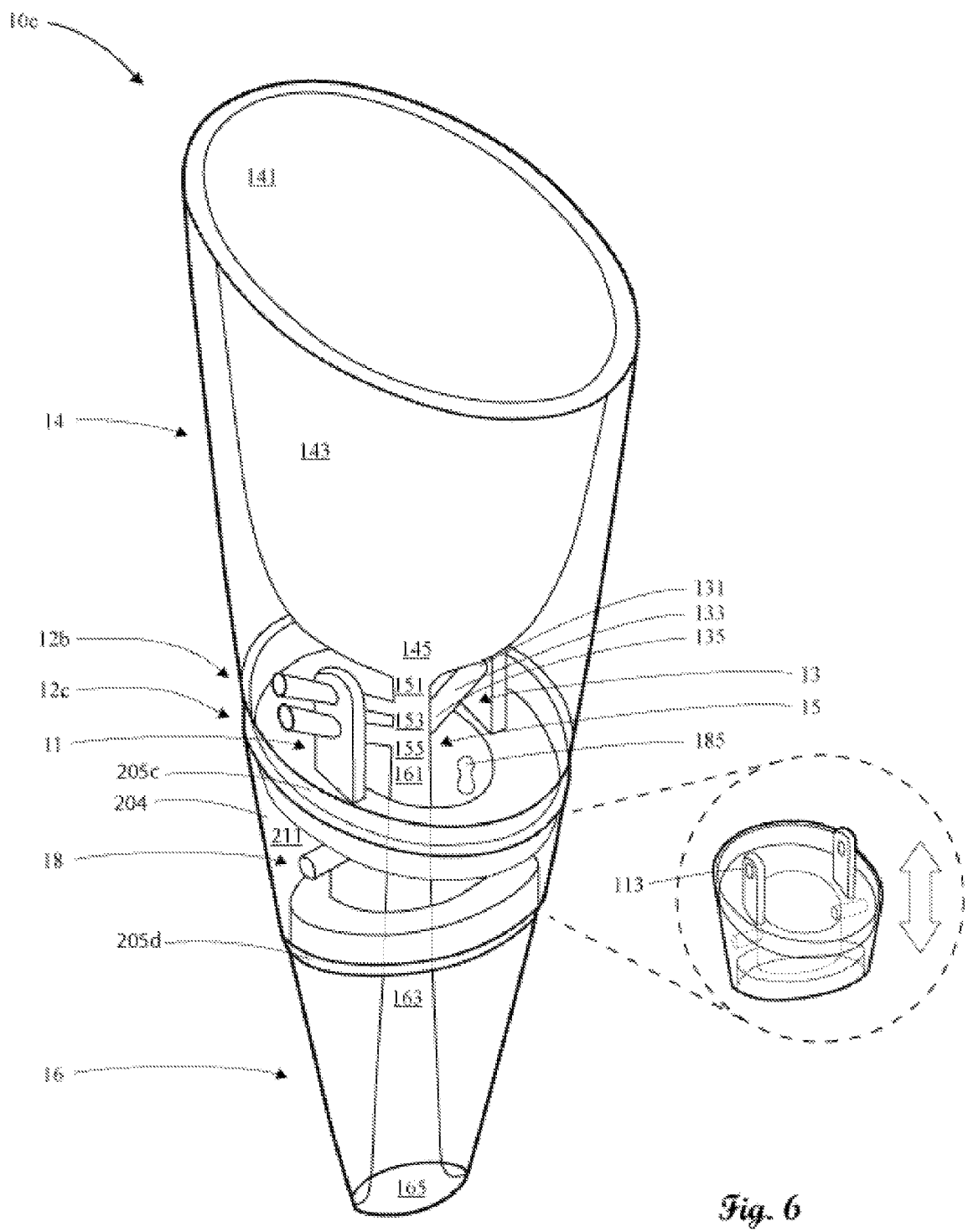
FIG. 6 depicts a second embodiment variable by axial movement of a throttling plate.
Figure 7:
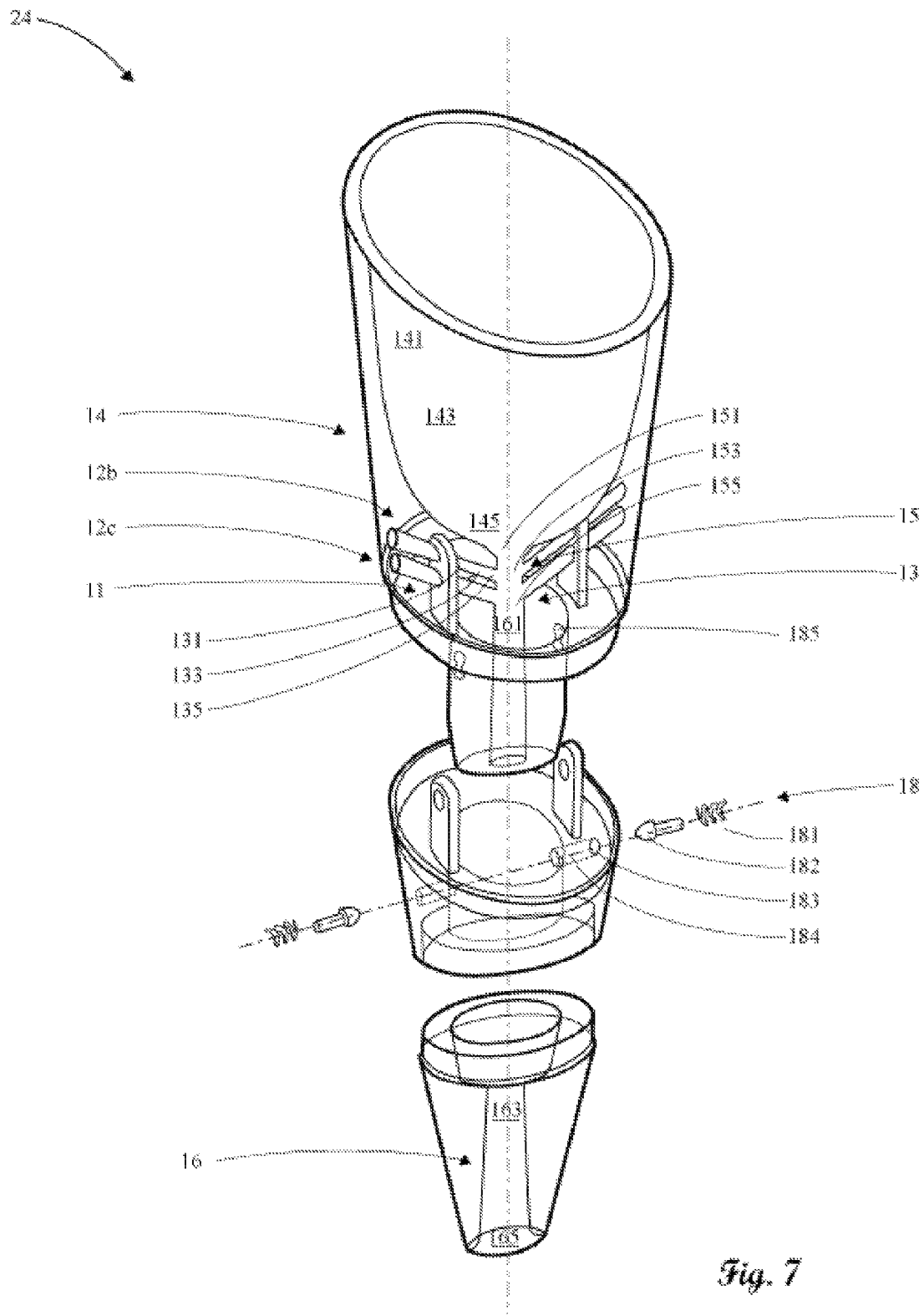
FIG. 7 is an exploded view of the second embodiment.
Figure 8:
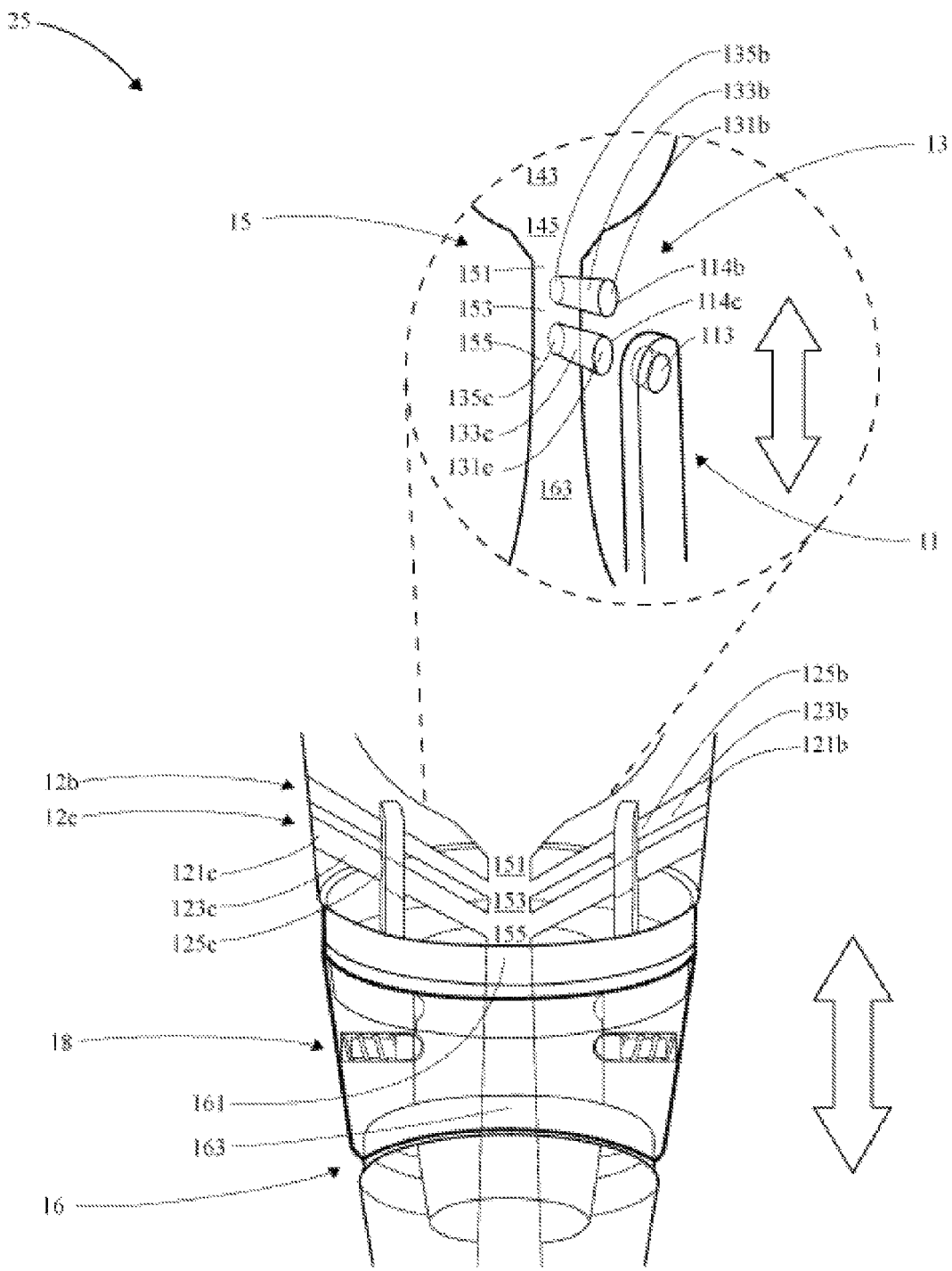
FIG. 8 is an exploded view of the plate throttle of the second embodiment.

FIGS. 6, 7, and 8 depict a second embodiment 10c of the variable aerator. A liquid path though a venturi throat 15 includes a funnel 14, the bowl 15 and a horn 16. An airflow path into the bowl 15, includes a first barrel segment 12 and a second barrel segment 13 interrupted by a throttle 11. Unlike the first embodiment, however, the variability of the throttle is not continuous over a range of aeration values but, rather, allows for distinct values based upon selectively blocking the passage of airflow through a selected number of first barrel segments 12 into second barrel segments 13 for admission into the bowl 15.

In this second embodiment of the aerator, the constricted section of the passage to produce the Venturi Effect occurs at a venturi bowl 15, where a funnel outlet 145 and a bowl inlet 151 meet. Airflow is there introduced through a plurality of second barrel segments 13 each having a second barrel intake 131 and a second barrel lumen 133 that discharges the airflow at its second barrel outlet 135.

As indicated above, aeration of the liquid is a function of a throttled flow of air into the bowl 15 at the second barrel outlet 135. An airflow is conducted into the bowl 15 from the ambient by such of the first barrel segments 12 at a first barrel inlet 121 as are not obstructed by a throttle plate 113. As in the first embodiment, continuity of the barrel segments 12, 13 is interrupted by the throttle 11. Movement of the throttle plate axially selectively occludes and admits airflows in passing from each of the first barrel segments 12 to the second barrel segments 13. The throttle 11, then, operates by selectively occluding various of the first barrel lumen segments 12 at a first throttle side located at the first barrel outlet 125. Because each of the first and second barrel lumens 123, 133 are of different diameters, switching solutions selectively occluding the barrel yield distinct levels of aeration.

All other numbered references have the same function as in the first embodiment. It is well-noted that while a sliding embodiment is illustrated, a rotating embodiment of the throttle plate is also possible wherein patterns of holes in the throttle plates admit distinct volumes of airflow. For example, if a maximum achievable aeration ratio is an arbitrary coefficient such that a second barrel lumen having a cross-section with area s, would maximally aerate a beverage, four second barrel segments having, respectively cross-sectional areas of s/2, s/4, s/8, and s/16, could be selectively obstructed to yield a range in 16 equal discrete steps ranging complete aeration to none whatsoever.

Figure 9:
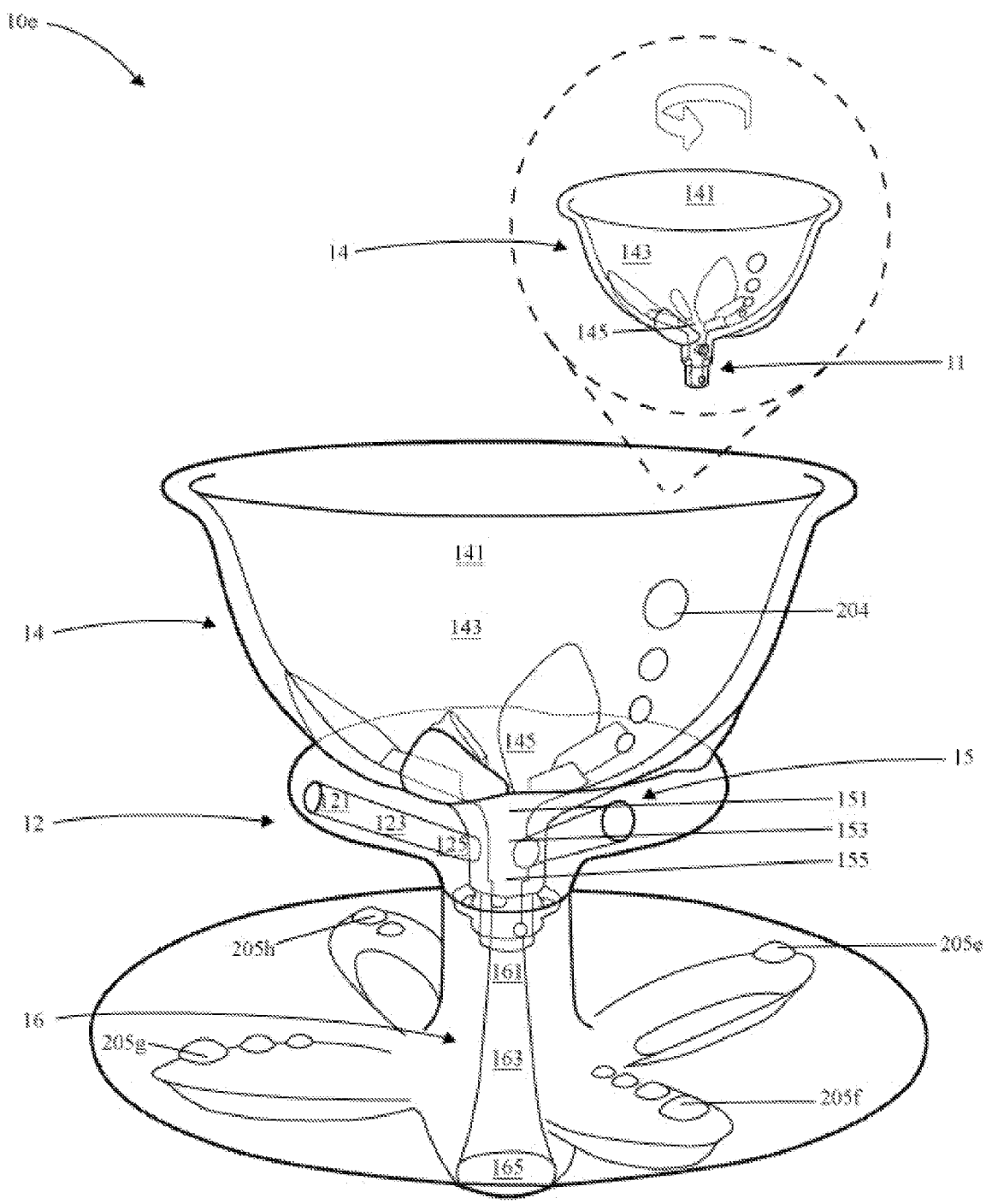
FIG. 9 is a third embodiment exploting a rotationally adjustable throttle plate.
Figure 10:
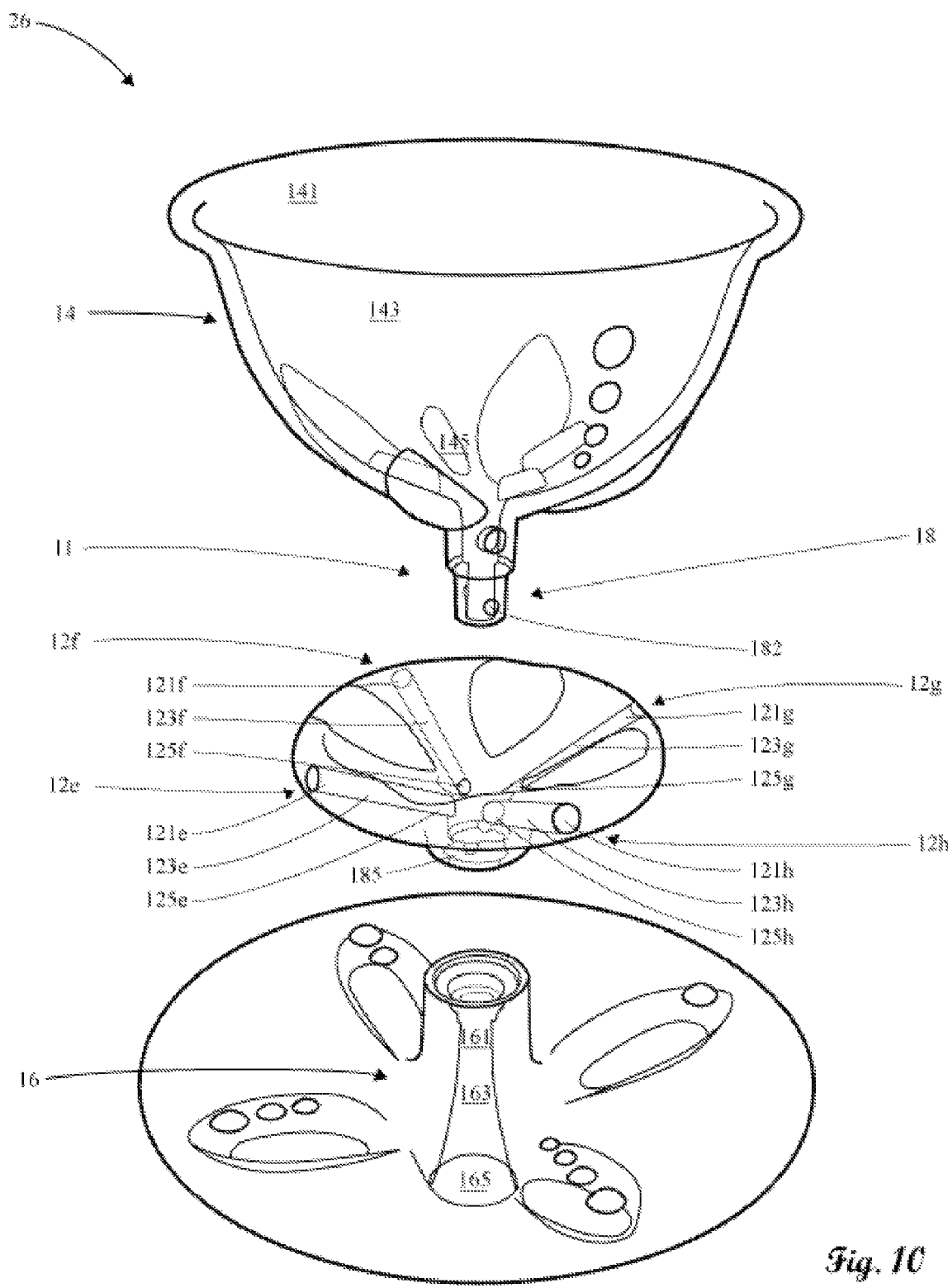
FIG. 10 is an exploded view of the rotational adjustable throttle plate.
Figure 11:
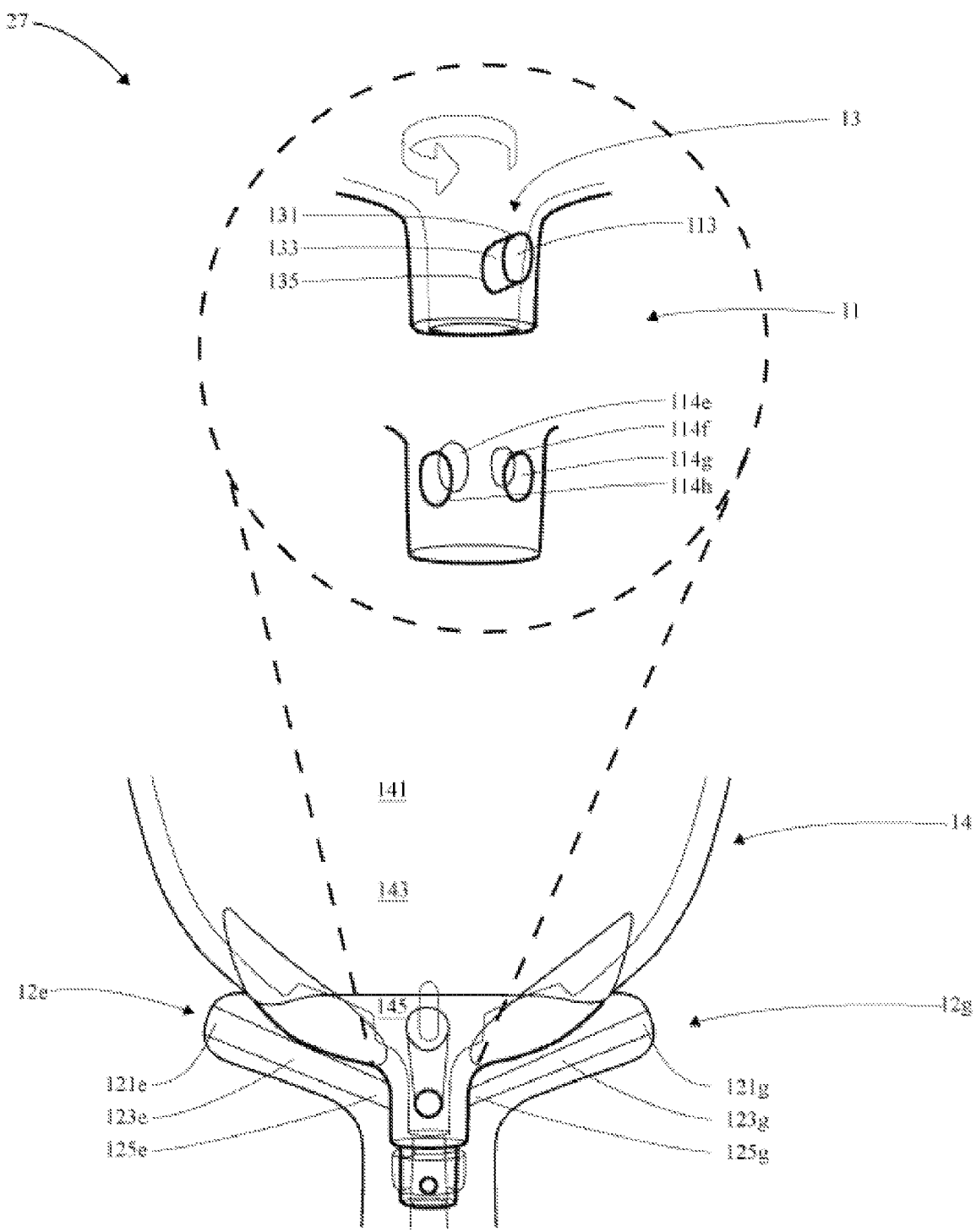
FIG. 11 depicts in exploded view elements of the rotationally adjustable throttle.

A third embodiment of the variable aerator would optionally exploit a similar stepped function of discrete settings to variably aerate a beverage. Illustrated in FIGS. 9-11, all reference numbers are each selected to denote the same function as in the prior embodiments and are incorporated by reference here except to the extent that they might be inconsistent with specific discussion set out below. Rotating to variably throttle an airflow through the second barrel lumens 13, the third embodiment also exploits discretely sized second barrel lumens 133 to admit known volumes of air for aeration in a bowl 15.

Not present in the prior two embodiments is a base that flares from the horn outlet to form a rest for the aerator 10e allowing the aerator to stand on a rim of a wineglass for aeration with employing a user hand for support of the aerator 10e. Ribs can be configured on the underside of the broad base to more stably engage a wine glass.

Styled as a tulip-shaped vessel having a broad base, the third embodiment of the aerator 10e is designed to aesthetically mimic the theme of the wineglass itself, thereby assembling glasses and the aerator 10e as gift sets, which are especially desirable for occasions such as holidays and weddings. Thus, in this third embodiment, the indicia 204 are in the form of subtle style elements to conform to an overall impression the third embodiment entails.

While the preferred embodiment of the invention has been illustrated and described, as noted above, many changes can be made without departing from the spirit and scope of the invention. For example, indicia such as a spectrum of color or descriptive words might be used. Alternately, the barrel might be situated to enter the bowl at an angle to the liquid flow. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. An aerator for beverages comprising:
   a housing, defining a liquid passageway to receive a liquid flow, including:
   a funnel extending from a funnel inlet converging in a downstream direction at a funnel outlet;
   a bowl coaxially situated to the funnel and converging in the downstream direction at a bowl outlet in axially spaced in the downstream direction from the funnel; and
   a horn extending from the bowl outlet and flaring downstream to a horn outlet having a greater cross-sectional area than that of the bowl outlet, the horn coaxially situated to the bowl and the funnel, axially spaced in the downstream direction from the bowl; and
   a barrel having a barrel lumen extending from a barrel inlet to a barrel outlet, the barrel inlet being situated to admit an airflow of ambient air from outside of the housing through the lumen and into the bowl, the barrel including:
   a throttle interrupting the barrel lumen; the barrel further includes: a first barrel segment defining a first barrel lumen segment that the barrel lumen comprises, the first barrel segment extending from the barrel inlet to a throttle first side; and a second barrel segment defining a second barrel lumen segment that the barrel lumen comprises, the second barrel segment extending from a throttle second side to the barrel outlet; the first and second barrel segments being arranged such that movement of the first barrel segment relative to the second barrel segment causes movement of the throttle; the throttle comprising:
   a first half-moon port situated at the first throttle side of the first barrel segment; and
   a second half-moon port situated at the second throttle side of the second barrel segment and in contact with the first half moon port such that rotation of the first barrel segment relative to the second barrel segment operates the throttle such that the airflow is regulated by variably obstructing air movement through the throttle.

2. The aerator of claim 1 wherein the first barrel segment further includes a collar at the barrel inlet such that rotation of the collar about a barrel axis causes rotation of the first barrel segment relative the second barrel segment.

3. The aerator of claim 2 wherein the collar includes indicia, the position of which relative to an index indicates a first barrel segment rotational position relative to the second barrel segment.

4. The aerator of claim 1 wherein the throttle comprises:
   the second barrel segment includes a plurality of second barrel segments, each of the second barrel segments being sized to have a known cross-sectional area; and a throttle plate having at least one aperture and being configured to selectively obstruct admission of an airflow to some of the second barrel segments such that movement of the throttle plate operates the throttle to vary obstruction of an airflow thereby admitting a known volume of the airflow into the bowl for aeration.

5. The aerator of claim 1 wherein
the barrel is situated in axial alignment with the funnel.

6. The aerator of claim 1 wherein
the funnel includes a liquid strainer such that solids in a flow of liquid admitted into the funnel inlet are retained at the strainer as the liquid flow passes through the funnel outlet into the bowl.

7. The aerator of claim 1 wherein the housing includes
a rest immediate to the horn outlet, the rest configured to support the housing within a beverage vessel.

8. The aerator of claim 1 wherein
the bowl is further configured to exploit the kinetic energy of the liquid flow to create perturbation bringing about more complete mixing of the air and liquid the liquid flow comprises.

9. An adjustable throttle assembly for variably aerating a beverage, the throttle assembly comprising: the throttle assembly extending as a barrel from a barrel inlet in the ambient to a barrel outlet immediate to a venturi throat, a venturi comprises, the throttle assembly comprising:
a first barrel segment defining a first barrel lumen segment extending from the barrel inlet to a first throttle side the first throttle side including a half-moon port;
a second barrel segment defining a second barrel lumen segment extending from a throttle second side to the barrel outlet and originating at a second throttle side including a second half-moon port such that rotation of the first barrel segment relative to the second barrel segment will work to variably regulate an airflow of ambient air drawn through the first and second barrel lumen segments drawn by a liquid flow through the venturi.

10. The throttle assembly of claim 9; wherein the first barrel segment further includes a collar at the barrel inlet such that rotation of the collar about a barrel axis causes selective obstruction of airflow into the second barrel segment to yield a known aeration at the bowl.

11. The throttle assembly of claim 10, wherein the collar includes
indicia, the position of which relative to an index indicates a known volume of an airflow admitted into the second barrel lumen for aeration of a beverage.

12. The throttle assembly of claim 9, wherein
the barrel is situated in axial alignment with the venturi throat.

13. The throttle assembly of claim 9, where the barrel further comprises
a liquid strainer such that solids in a flow of liquid admitted through the venturi throat are retained at the strainer as the liquid flow passes out of the venturi.

* * * * *